3,424,650
METHOD OF IMPROVING DRY STRENGTH OF PAPER
Myron J. Jursich and Thomas Aitken, Chicago, Ill., assignors to Nalco Chemical Company, Chicago, Ill., a corporation of Delaware
No Drawing. Filed Nov. 5, 1965, Ser. No. 506,593
U.S. Cl. 162—175      4 Claims
Int. Cl. D21h *3/28*

---

ABSTRACT OF THE DISCLOSURE

A starch composition comprising 60–98% by weight of starch which has been reacted with 2–40% by weight of a formaldehyde-guanidine-melamine resin. The starch compositions are useful for treating paper.

---

This invention relates to a process for manufacturing paper. It is particularly concerned with the manufacture of paper having improved dry strength and other improved properties. The invention is further concerned with novel starch compositions useful in producing paper products and also with a method of improving the use of starch as an agent for addition to paper products during their manufacture.

Starches of different types have been used in the production of paper for many years to achieve varying aims such as to increase sheet strength. Indicative of this widespread usage are the various uses of starch decribed in the article by M. L. Cushing and K. R. Schuman, "Fiber Attraction and Interfiber Bonding—The Role of Polysaccharide Additives," which appears in the December 1959 issue of TAPPI.

One of the chief difficulties in using starch as a wet end additive for improving various papers is that it is difficult to adequately retain the starch on the sheet. In most instances the majority of starch added is lost in the papermaking process. Many attempts have been made to improve retention of starch by cellulosic fibers.

In some instances efforts have been made to thermally modify starch. In other instances starch has been treated with chemicals in attempts to render it more susceptible to being retained by fibers. While both of these approaches have met with some measure of success in improving the retention characteristics of starches, nevertheless a high percentage of starch is lost through nonadherence to the paper fiber.

It would be advantageous to the art of papermaking if it were possible to provide a simple method for improving the ability of starch to be retained by cellulosic fibers. Also of interest would be a paper manufacturing process which in a series of operation steps, would render the common starches more receptive to cellulosic fibers by prior modification of the starch materials with relatively inexpensive organic chemicals.

By improving the receptivity of cellulosic fibers to common starches modified with organic chemicals, it should be possible to produce paper having a greater amount of starch contained therein. This will afford a finished sheet having superior dry strength and many other improved characteristics which flow from the incorporation therewith of bonded, well dispersed starches.

Based on the above, it is therefore an object of the invention to provide an improved process for the manufacture of paper.

Another object is to provide a method whereby starch may be inexpensively and simply modified just prior to introduction into the pulp stream so that it is highly receptive to cellulosic fibers.

A further object is to furnish a method for simply modifying starch to produce a starch product of extreme value to the papermaking industry.

Other objects will appear hereinafter.

In accordance with the invention, it has been found that an improved paper product may be provided by treating a papermaking stock prior to its formation into a sheet with a formaldehyde-melamine-guanidine resin modified starch. More particularly, it has been discovered that paper may be improved by treating an aqueous suspension of pulp with the just-mentioned resin modified starch which is prepared by treating an aqueous suspension of starch with 2–40% by weight of the formaldehyde-guanidine-melamine resin. For purposes of simplicity, the formaldehyde-guanidine-melamine resin will be hereinafter referred to generally as resin.

The particular resins useful in modifying starch to measurably increase dry strength of paper treated with the thus modified starch should be synthesized by reacting 9–14 moles of formaldehyde with about 0.4–1.6 moles each of melamine and guanidine. Preparation of resins falling without the above-recited mole ratio range are generally unstable, and gel upon short periods of standing. The gel product is then useless for its intended purpose of modifying starch molecules. Also, resinous materials not within the scope of the invention have been found to be substantially inferior in promoting starch retention by pretreatment thereof. Again, condensation copolymers of any two of the three reactants exhibit markedly less storage stability and/or less activity in their intended use as starch modifiers. Thus, inclusion of all three materials as reactants in the above mole ratio range is critical in order to produce a relatively stable resin useful in increasing dry strength of paper articles by prior reaction with starch materials.

A preparation of a typical material falling within the class of resin modifiers is given below.

EXAMPLE I

In this example, the resin polymerization was performed in a 1500 ml. beaker covered with aluminum foil. The beaker was immersed in a water bath supplied with suitable temperature control. Mixing was carried out by means of a magnetic bar mixer. 450 grams of a 37% formaldehyde was placed in the beaker and heated to 60° C. With mixing, 180 grams of paraformaldehyde, 189 grams of melamine, 143 grams of guanidine hydrochloride and 120 grams of isopropanol were added rapidly to the formaldehyde solution. During the whole of the reaction, 56.4 grams of 50% sodium hydroxide was periodically added with only sufficient caustic initially added to raise the pH to 8.2. The molar ratio of formaldehyde to melamine to guanidine was 7.4:1:1. The beaker was then placed in the water bath at 80° C. and maintained at this temperature. Additional solutions of caustic were added throughout reaction so as to maintain the pH between about 7.4 and 8.2. After about 7 hours, a viscous resin solution was achieved. The resin was then allowed to cool to about 60° C. and additional formaldehyde was added with stirring. In this run, 2.6 moles of additional formaldehyde solution was added, yielding a final resinous product stable in solution form for at least three months. The final product was thus formed by reaction of 10 moles of formaldehyde and one mole each of melamine and guanidine. The 35% solids product had a viscosity of 50 c.p.s. as measured with a Brookfield viscometer.

Preferred resin products should be polymerized while maintaining the pH of the reaction mass within about 4 to about 10 and more preferably, 7 to 10. Again, it is preferred that the resin polymerization be carried out in presence of organic solvents such as alcohols, acetones, ethers, etc. A preferred solvating class is lower alkyl alcohols such as isopropanol. Generally, best results are obtained by effecting the polymerization with mild heating in the range of about 40–90° C., and more preferably, 50–90° C.

With respect to the particular reactants, any solution of formaldehyde may be employed, including both gaseous formaldehyde, liquid formaldehyde and the solid trimer form, paraformaldehyde. Salts of guanidine as well as guanidine itself may be utilized, and thus by the term "guanidine" is meant the free base or any salt form thereof such as hydrochloride or carbonate salts.

Resins falling within the above-disclosed mole ratio range have a shelf life of at least 1 month, and more often at least 3 months. In this regard, a number of other resins were prepared falling without the mol ratio of the invention. Table I below demonstrates lack of stability of resins without the scope of the invention.

TABLE I

| Moles Formaldehyde | Moles guanidine | Moles melamine | Room temperature stability |
|---|---|---|---|
| 3 | 1 | | 4 days. |
| 3 [1] | 1 | | 8 hours. |
| 2.75 | | 1 | 1–3 days. |
| 4 | | 1 | 5 days. |
| 6 | 1 | 1 | 2–3 days. |
| 8 | 1 | 1 | 3 days. |
| 7.4 | 1 | 1 | 2 weeks. |
| 7.4 | 1.5 | 0.5 | 1 week. |

[1] Resin prepared at longer cook time than first resin in table.

A number of the resins of the invention were prepared and tested for shelf life both at room temperature and under an accelerated hot storage test. The stabilities of these resins are given below. In each instance the melamine to guanidine ratio was held at 1:1 with only the formaldehyde content being varied.

TABLE II

| Moles formaldehyde | Shelf life, weeks | |
|---|---|---|
| | HR [1] | RT [2] |
| 9.7 | 4 | 7 |
| 9.8 | 5 | 10 |
| 10.5 | 6 | 15 |
| 10.6 | 5 | 15 |
| 11.2 | 7 | 14 |
| 13.1 | 8.5 | 14 |

[1] HR—Stored in hot room.
[2] RT—Stored at room temperature.

In yet another series of tests, two additional resins were prepared, one comprising 9.75 moles of formaldehyde, 0.5 mole of melamine and 1.5 moles of guanidine hydrochloride, and the other made from 10.8 moles of formaldehyde, 0.5 mole of melamine and 1.5 moles guanidine hydrochloride. Each were stable at room temperature for over 6 months.

A variety of simple, inexpensive starches may be treated with the above-described resins to produce a superior paper article upon subsequent treatment of the percursor pulp. Starches susceptible to modification are, for example, potato, corn, tapioca, and other related, readily available starches. While the simple starches are preferred due to their availability and low price, it will be understood that other starch-type polysaccharides may be employed. In some cases, degraded wood celluloses may be utilized. Reaction of resins of the invention with starch is believed to occur with linking of starch and resin through ether groups accompanied by formation of a plurality of methylol groups.

The starch and resin when reacted are preferably provided as a relatively dilute aqueous suspension which contains from 1 to 40% by weight of the reactants and preferably 1–30% by weight. An amount of resin is present in relation to the starch so as to provide 2–40% of resin and preferably 3–30%, in relation to and based upon the weight of the starch.

The starch may be treated with the resin either prior to, during, or subsequent to gelatinizing or cooking the starch over a wide range of pH. Again, the starch may be treated with resin at room temperatures or higher, although it is greatly preferred that the aqueous suspension of starch be treated with resin at a temperature ranging from about 100° F. to 250° F. for ¼–10 hours. In the most preferred embodiment, starch in an ungelatinized state is both gelatinized and treated with resin simultaneously at a temperature ranging from about 120° F. to about 200° F. for 1–5 hours' time. By following this variant, paper sheets of exceptionally high strengths are obtained.

The above-described treated starch product may be used as such in aqueous suspension form or the water may be removed by means such as vacuum filtration, to provide a dry powdery material which is easily dispersed into the wet end of the papermaking process. It has been determined that best results are realized if the resin-treated starch product is introduced into the paper pulp stream immediately after modification of the starch. Generally, the resin-modified starch should be added to the pulp at a time ranging from a few seconds after starch modification up to 6–10 days thereafter. Most preferably, the starch is incorporated into the paper stream a few minutes up to 24 hours after resin modification.

The resin-modified starch may be added to the pulp at a variety of areas. It is preferred that it be added after the refining step, since appreciable amounts of mechanical work effected upon the pulp deleteriously affects retention of starch to the pulp. The treated starch may be added at the refiner outlet, fan pump, consistency regulator, headbox, etc.

EVALUATION OF THE INVENTION

In order to determine the efficacy of the invention, the following tests were made. Typical resins falling within the above-discussed class were prepared, added to various starches and the subsequently derived modified starch added to the pulp slurry. The dried paper articles were then tested for dry strength. Specifically, handsheets from unbleached softwood kraft (45 seconds Williams Slowness) were prepared on a Noble and Wood machine. Burst strengths were then determined. Results are tabulated in Table III below. In this study, tapioca starch was resin-modified at various concentrations and added to the pulp at a 1.25% level based on fiber weight.

TABLE III

| Percent starch concentration at time of resin treatment | Percent resin based on starch [1] | Conditions of resin modification of starch | Burst increase |
|---|---|---|---|
| 4 | 5 | Cooking resin and starch at neutral pH. | 10.7 |
| 4 | 5 | Cooking starch and resin at acid pH. | 15.7 |
| 3.5 | 10 | Cooking starch and resin at alkaline pH. | 15.1 |
| 2.7 | 10 | Addition of resin after cooking starch at neutral pH. | 14.5 |
| 2.7 | 10 | Addition of resin and hydrochloric acid after cooking starch. | 19.5 |
| 3.5 | 10 | Addition of resin and alum after cooking starch. | 15.5 |
| 2.7 | 5 | Addition of caustic and resin after cooking starch. | 12.9 |
| 4 | | | 3 |

[1] Resin of Example I.

Other starches were also modified with the resin of Example I and evaluated for strength increase in terms of burst increase at 1.25% based on dry fiber weight. Results are summarized in Table IV below.

TABLE IV

| Starch type | Percent starch concentration at time of resin treatment | Percent resin based on starch | Conditions of resin modification of starch | Burst increase |
|---|---|---|---|---|
| Corn | 4 | 10 | Cooking of resin and starch in presence of alum. | 9.7 |
| Milo | 4 | 10 | ----do---- | 12.3 |
| Potato | 4 | 10 | ----do---- | 9.0 |

In the above studies, use of starches alone without benefit of resin modification increased burst strength in the range of 2–4 units over that of a blank or pulp prepared without benefit of starch or resin-modified starch.

The invention allows common starches to be utilized as papermaking additives with good results being obtained in nearly all cases. It has been observed that the best results are obtained when the starch contains at least some amylopectin in combination with amylose. It is contemplated that amylopectin alone may be used as a starch material.

Specialty starches such as dextrins, and the like, may also be utilized as a starch material, although the invention is mainly directed toward the utilization of common non-modified starches.

Papers treated according to the invention, in addition to having improved dry strength, oftentimes will have other improved characteristics such as, for example, improved internal bond, fold, tensile and pick resistance, ply bonding, etc. The invention also allows a smaller amount of starch to be employed and yet achieve results comparable to those obtained by excessive loadings of conventional starch treatments.

Also, it was noted that drainage properties of the wet web were improved as well as increase in machine speeds realized through use of the resin-modified starch versus sole use of starch additive.

Typical paper stocks that may be treated are kraft, bleached kraft, softwood kraft, hardwood kraft, bleached and unbleached sulfites, groundwood and alpha sulfite.

The invention is hereby claimed as follows:

1. A process for the production of paper having improved strength and other improved properties which comprises the sequential steps of forming an aqueous cellulosic fiber suspension, adding to said suspension at a point prior to its formation into a sheet a resin-modified starch, said modified starch having been prepared by cooking an aqueous starch suspension with 2–40% by weight of a stable resin at a temperature of 100–250° F. for ¼–10 hours, said resin being formed by reacting 9–14 moles formaldehyde with 0.4–1.6 moles each of guanidine and melamine; and then forming said aqueous cellulosic fiber suspension containing said modified starch into a sheet.

2. The process of claim 1 wherein said resin is formed by reacting about 10 moles formaldehyde with one mole each of melamine and guanidine.

3. A starch composition comprising 60–98% by weight of starch reacted with 2–40% by weight of a stable resin prepared by reacting 9–14 moles of formaldehyde with 0.4–1.6 moles each of guanidine and melamine.

4. A starch composition comprising 60–98% by weight of starch reacted with 2–40% by weight of a stable resin, said modified starch having been prepared by cooking an aqueous suspension of said starch with 2–40% by weight of said resin at a temperature of 100–250° F. for ¼–10 hours, said resin being prepared by reacting 9–14 moles formaldehyde with 0.4–1.6 moles each of guanidine and melamine.

References Cited

UNITED STATES PATENTS

| 2,485,079 | 1/1944 | Wohnsiedler et al. | 162—167 X |
| 2,621,174 | 12/1952 | Gaver et al. | 260—233.3 X |
| 2,797,206 | 6/1957 | Suen et al. | 162—167 X |
| 3,002,881 | 10/1961 | McDonnell et al. | 162—167 X |
| 2,998,344 | 8/1961 | Carlson | 162—175 X |

DONALL H. SYLVESTER, *Primary Examiner.*

T. G. FERRIS, *Assistant Examiner.*

U.S. Cl. X.R.

260—233.3; 162—167